(12) United States Patent
Nunna

(10) Patent No.: US 12,499,502 B2
(45) Date of Patent: Dec. 16, 2025

(54) WATERMARKS FOR TEXT DOCUMENTS

(71) Applicant: Hewlett-Packard Development Company, L.P., Spring, TX (US)

(72) Inventor: Bharani Nunna, Bangalore (IN)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 458 days.

(21) Appl. No.: 18/021,375

(22) PCT Filed: Apr. 26, 2021

(86) PCT No.: PCT/US2021/070452
§ 371 (c)(1),
(2) Date: Feb. 14, 2023

(87) PCT Pub. No.: WO2022/047440
PCT Pub. Date: Mar. 3, 2022

(65) Prior Publication Data
US 2024/0037689 A1 Feb. 1, 2024

(30) Foreign Application Priority Data
Aug. 31, 2020 (IN) .............................. 202041037520

(51) Int. Cl.
*G06F 21/16* (2013.01)
*G06T 1/00* (2006.01)

(52) U.S. Cl.
CPC .............. *G06T 1/005* (2013.01); *G06F 21/16* (2013.01); *G06T 2201/0051* (2013.01); *G06T 2201/0062* (2013.01)

(58) Field of Classification Search
CPC ............. G06T 1/005; G06T 2201/0051; G06T 2201/0062; G06F 21/16
See application file for complete search history.

(56) References Cited

U.S. PATENT DOCUMENTS 9,928,559 B2 3/2018 Lahmi et al.
2006/0075241 A1* 4/2006 Deguillaume ..... H04N 1/32256
713/176

(Continued)

FOREIGN PATENT DOCUMENTS

CN 1700205 A 11/2005
CN 102968582 A 3/2013

(Continued)

OTHER PUBLICATIONS

Ahvanooey et al., "A Comparative Analysis of Information Hiding Techniques for Copyright Protection of Text Documents", Security and Communication Networks, Apr. 2018, pp. 1-22.

*Primary Examiner* — Han Yang
(74) *Attorney, Agent, or Firm* — Michael Dryja

(57) ABSTRACT

According to examples, an apparatus may include a processor and a memory on which are stored machine-readable instructions that when executed by the processor, may cause the processor to extract text from a document. The processor may retrieve images associated with characters in the extracted text and generate a stitched image using the retrieved images. The processor may watermark the stitched image and replace the characters in the document with the images associated with the characters from the watermarked and stitched image.

20 Claims, 5 Drawing Sheets

(56) References Cited

U.S. PATENT DOCUMENTS

| | | | |
|---|---|---|---|
| 2008/0297853 A1* | 12/2008 | Yang | H04N 1/32219 358/3.28 |
| 2015/0228045 A1* | 8/2015 | Mehta | G06T 1/0064 382/103 |
| 2016/0035060 A1* | 2/2016 | Lahmi | G06T 1/0028 382/100 |
| 2017/0329943 A1* | 11/2017 | Choi | H04L 63/0428 |

FOREIGN PATENT DOCUMENTS

| | | |
|---|---|---|
| CN | 109815653 A | 5/2019 |
| CN | 110414194 A | 11/2019 |

* cited by examiner

METHOD
400

EXTRACT TEXT THAT INCLUDES A PLURALITY OF CHARACTERS FROM A DOCUMENT
402

RETRIEVE IMAGES CORRESPONDING TO THE PLURALITY OF CHARACTERS
404

COMBINE THE IMAGES TO FORM A STITCHED IMAGE OF THE EXTRACTED TEXT
406

EMBED A WATERMARK IN THE STITCHED IMAGE
408

SEPARATE THE WATERMARKED AND STITCHED IMAGE INTO A PLURALITY OF WATERMARKED IMAGES CORRESPONDING TO THE PLURALITY OF CHARACTERS
410

REPLACE THE PLURALITY OF CHARACTERS IN THE DOCUMENT WITH THE PLURALITY OF WATERMARKED IMAGES
412

*FIG. 4*

WATERMARKS FOR TEXT DOCUMENTS

BACKGROUND

Computing devices may add watermarking to documents. In some examples, the documents may be in an image format and the watermarks may be added to a layer of the image in the document.

BRIEF DESCRIPTION OF THE DRAWINGS

Features of the present disclosure are illustrated by way of example and not limited in the following figure(s), in which like numerals indicate like elements, in which:

FIG. 4 shows a flow diagram of an example method for forming a stitched image of extracted text from a document and embedding a watermark in the stitched image to generate a watermarked document.

DETAILED DESCRIPTION

Figure 1:
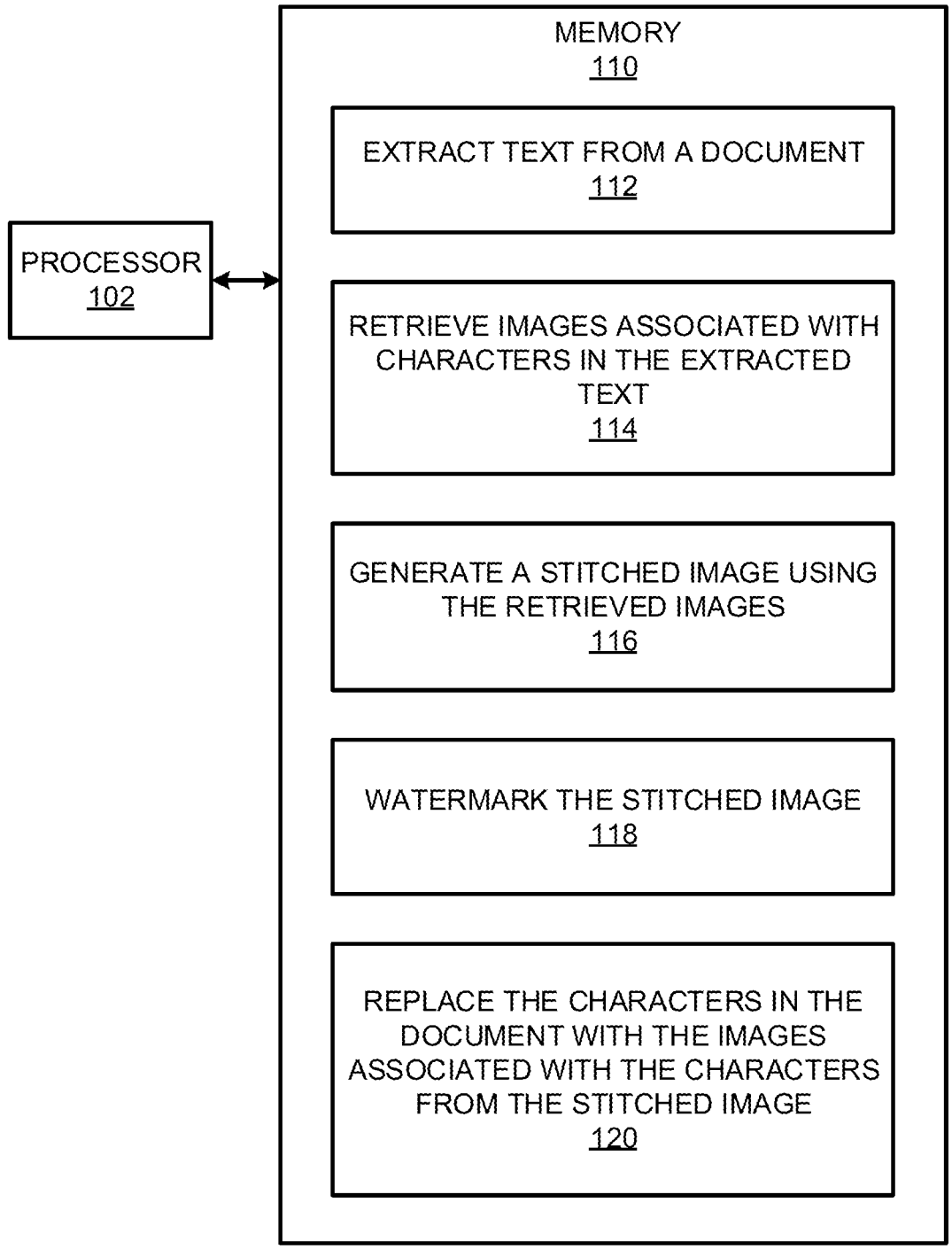
FIG. 1 depicts a block diagram of an example apparatus that may embed a watermark in a document using a stitched image of images of characters in the document.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Various types of documents may include watermarks to protect the documents, verify the authenticity or integrity of the documents, and/or the like. Watermarking documents that is mostly text or are rich in text may pose certain challenges when compared to documents that may be formatted as images. In some examples, in order to watermark a text rich document, a tint may be added to a layer in the text rich document, either in the foreground or the background. In other examples, a logo or another type of image may be overlaid on the document. For instance, the document may be converted into an image format, a watermark may be added to the converted image, and a document having the watermarked image may be reconverted to the format of the original document. However, a concern associated with such types of watermarks may be that the size of the document may increase due to the addition of the tint, which may often be applied to an image of an entire page of the text rich document. In some instances, the added tint may obstruct a view of the document and/or may degrade a quality of the image, for instance due to blurring. The added tint may also use more ink when printing the document. In some cases, the tint added to a background of a document may decrease a detectability of the watermark for documents with dense text. In other instances, the watermark added in this manner may cause degradation in image quality due to lossy conversions when reconverting the watermarked image into the original document format.

Disclosed herein are apparatuses, systems, methods, and computer-readable media that may enable efficient watermarking for text rich documents, which may have a group of words containing characters and/or symbols. A text rich document may have a predetermined amount of text relative to other types of objects such as logos, graphical illustrations, and/or the like. In some examples, the predetermined amount or threshold of text for a text rich document may be user-defined, based on testing/experimentation, based on prior knowledge in watermarking text documents, and/or the like. A processor as disclosed herein may capture individual characters and/or symbols as images, for instance, as present in a font file of the document. These images of individual characters and/or symbols may be grouped/stitched together to form a larger image, which may be watermarked. In addition, the watermarked text document may be constructed by replacing each character in the original document using portions of the stitched/watermarked image corresponding to the character.

In some examples, the processor disclosed herein may extract text from a document and retrieve an image associated with characters in the extracted text. The processor may generate a stitched image using the retrieved images and may watermark the stitched image. The processor may replace the characters in the document with the images associated with the characters from the stitched image. In this regard, the images to replace the characters in the document may include the watermark.

Through implementation of the features of the present disclosure, a processor may enable watermarking for text rich documents using a stitched image that includes a watermark. By using such a stitched image to embed a watermark, a size of the watermarked document may be reduced when compared to watermarking techniques that convert the document to an image for watermarking. In some examples, the processor may improve readability of the document through replacing, for instance, a full page tinted image for watermarking with the individual watermarked images that represent the characters in the text document. In some examples, watermarked documents of the present disclosure may reduce ink consumption when printed on a printer.

Reference is made to FIGS. 1, 2, and 3A to 3D. FIG. 1 shows a block diagram of an example apparatus 100 that may embed a watermark in a document using a stitched image of a plurality of images of characters in the document.

Figure 2:
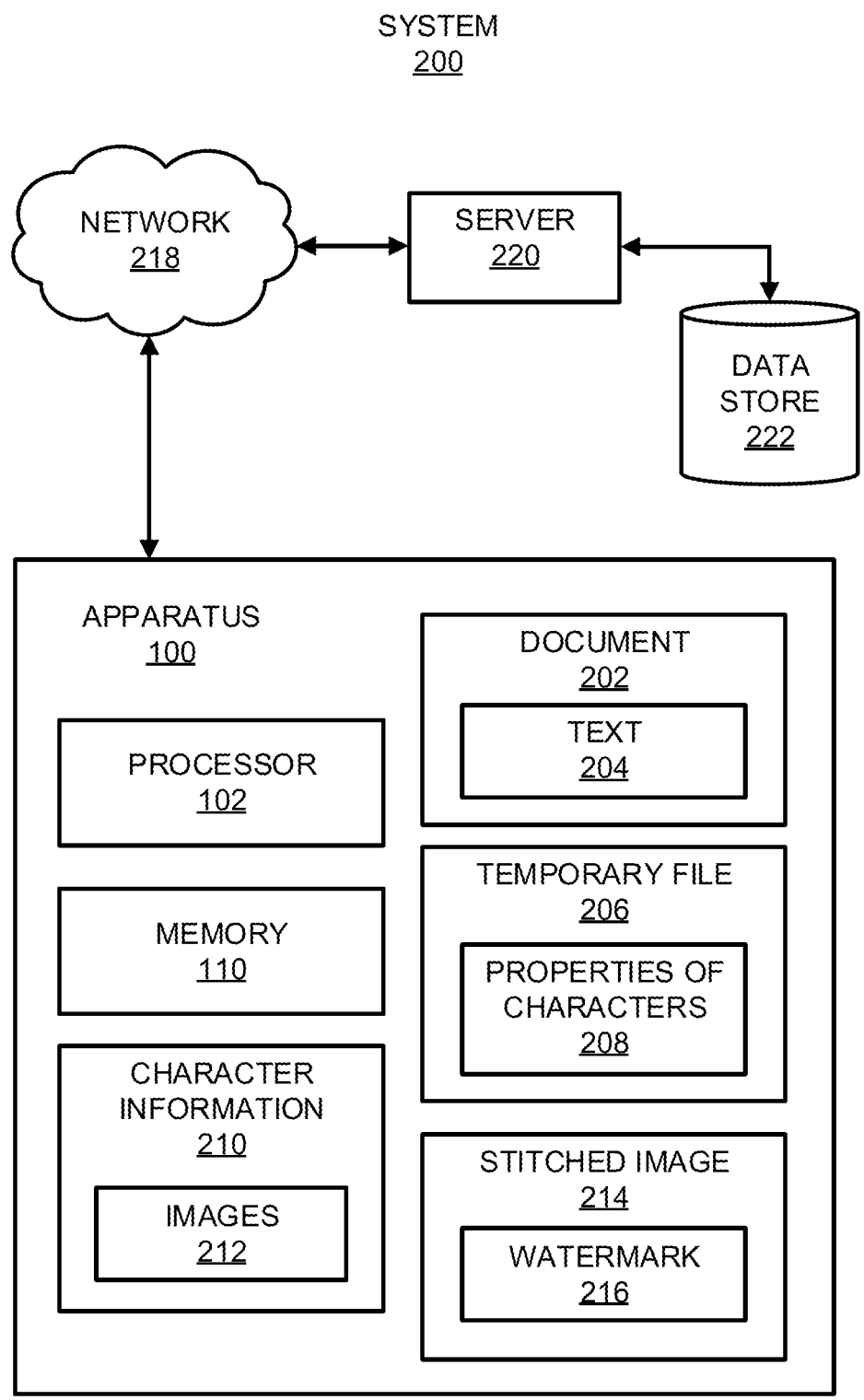
FIG. 2 shows a block diagram of an example system within which the example apparatus depicted in FIG. 1 may be implemented.
Figure 3A:
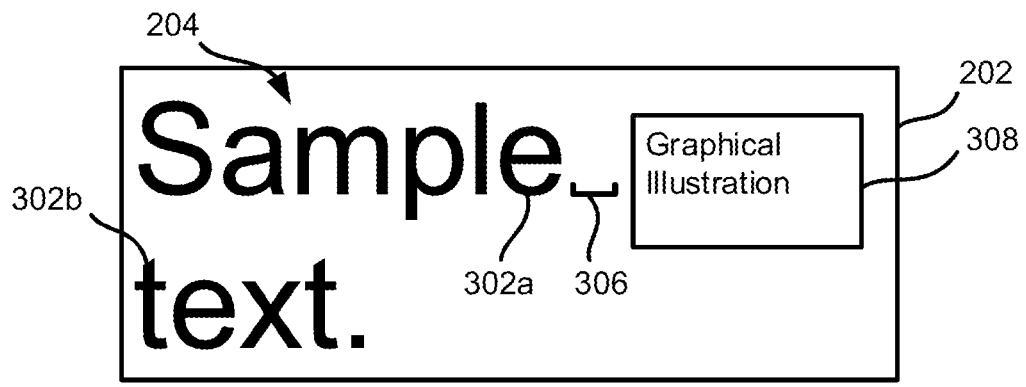
FIG. 3A shows a diagram of an example document having a sample text and a graphical illustration.
Figure 3B:
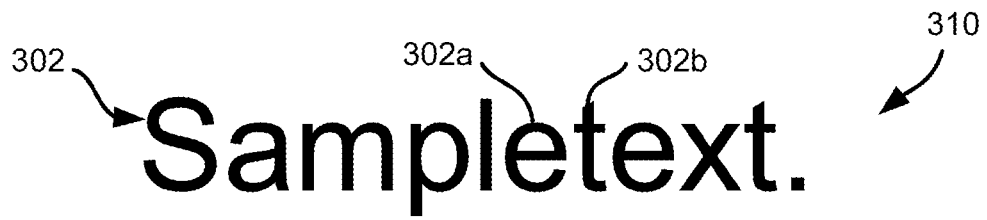
FIG. 3B shows a diagram of an example text extracted from the document depicted in FIG. 3A.
Figure 3C:
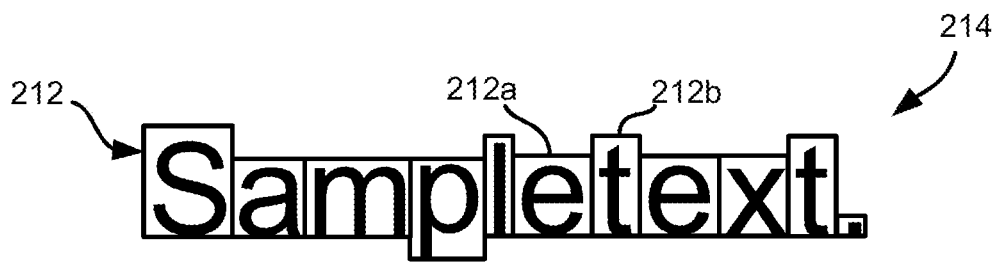
FIG. 3C shows a diagram of an example stitched image using images associated with characters of text extracted from the document depicted in FIG. 3B.
Figure 3D:
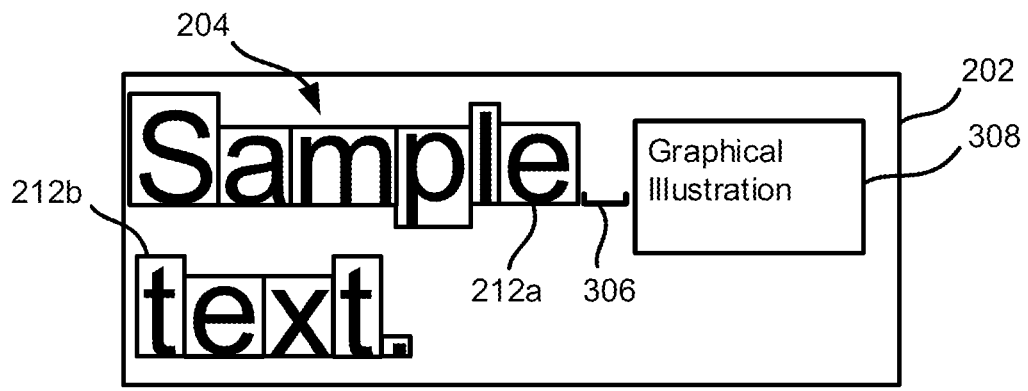
FIG. 3D shows a diagram of an example document in which characters of text are replaced with corresponding images associated with the characters from the stitched image having a watermark as depicted in FIG. 3C.

FIG. 2 shows a block diagram of an example system 200 that may include the example apparatus 100 depicted in FIG. 1. FIG. 3A shows a diagram of an example document having a sample text and a graphical illustration. FIG. 3B shows a diagram of an example text extracted from the document depicted in FIG. 3A and FIG. 3C a diagram of an example stitched image using images associated with characters of text extracted from the document depicted in FIG. 3B. FIG. 3D shows a diagram of an example document in which characters of text are replaced with corresponding images associated with the characters from the stitched image having a watermark as depicted in FIG. 3C. It should be understood that the apparatus 100 depicted in FIG. 1, the system 200 depicted in FIG. 2, and/or the features depicted in FIGS. 3A to 3D may include additional features and that some of the features described herein may be removed and/or modified without departing from the scopes of the apparatus 100 and/or the system 200.

The apparatus 100 may include a processor 102 and a memory 110. The apparatus 100 may be a computing device, including a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-120 to embed a watermark in a document. The instructions 112-120 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-120.

The processor 102 may fetch, decode, and execute the instructions 112 to extract text from a document, such as text 204 in a document 202 as depicted in FIGS. 2 and 3A. In some examples, the document 202 may include various objects such as the text 204, which may include a plurality of characters 302 and spaces, such as a space 306 between characters 302a and 302b, a graphical illustration 308, and/or the like. In some instances, the plurality of characters 302 may include symbols, numbers, various types of fonts, and/or the like.

In some examples, the processor 102 may parse the objects in the document 202. The parsed objects in the document 202 may include the text 204 and a graphical illustration 308, such as a picture, a company logo, and/or the like. The processor 102 may determine, based on the parsed objects, that an amount (e.g., percentage) of the text 204 in the document 202 exceeds a predetermined threshold. By way of particular example and for purposes of illustration, the processor 102 may parse a page of a book that has mainly text with or without images, and may determine that the amount (e.g., percentage) of the text 204 on the page exceeds the predetermined threshold. In some instances, the predetermined threshold may be based on a percentage of text relative to graphical illustrations on the page, an area of the page occupied by the text, a number of words or characters, and/or the like. In addition, the predetermined threshold may be user-defined, may be based on testing, and/or the like.

In some examples, based on a determination that the amount of text 204 in the document 202 does not exceed the predetermined threshold, the processor 102 may embed a watermark into the document 202, for instance, by converting the document 202 into an image file and adding the watermark into a foreground layer or a background layer of the image file. In some examples, based on a determination that the amount of the text 204 in the document 202 exceeds the predetermined threshold, the processor 102 may extract the text 204 from the document 202 to generate a modified watermark to be added to the document 202.

Referring to FIG. 3B, the processor 102 may extract the characters 302 of the text 204 while ignoring other objects in the document 202. For instance, the processor 102 may arrange the extracted text 310 by omitting any other type of objects in the document 202, such any spaces 306 between the plurality of characters 302, any graphical illustrations 308 in the document 202, and/or the like. In this regard, the processor 102 may identify the plurality of characters 302 and any spaces 306 between the plurality of characters 302 in the text 204, and may remove the spaces 306 to position the plurality of characters 302 adjacent to each other in a predetermined order (e.g., in the same order as in the original document) in the extracted text 310. By way of particular example, the processor 102 may remove the space 306 between the character 302a (the letter "e") and the character 302b (the letter "t"), and may place the character 302a and the character 302b adjacent to each other in the extracted text 310, as depicted in FIG. 3B. In this regard, each of the extracted characters 302 may be positioned in the same order as in the document 202.

In some examples, the processor 102 may copy a respective property 208 of each of the plurality of characters 302 extracted from the document 202 to a temporary file 206. For instance, the processor 102 may retrieve the properties 208 associated with the plurality of characters 302 from the document 202 and/or from character information 210 available in the apparatus 100. In this regard, a property 208 of a particular character 302 may be unique to the particular character 302, or alternatively or additionally, a property 208 may be generic to a group of characters 302. In some examples, the character information 210 may include information for fonts available on the apparatus 100. By way of particular example and for purposes of illustration, the character information 210 may be a font file associated with the document 202 and available on the apparatus 100. The font file may include information for fonts installed on the apparatus 100. In some examples, the font file may include information for bitmap font formats, outline font formats, stroke font formats, and/or the like. In some examples, the font file may be for TrueType font (TTF), PostScript font, OpenType font, and/or the like.

The properties 208 of the characters 302 that are copied into the temporary file 206 may include a font, a size, a location, a line number associated with the character in the document 202, a page number associated with the characters in the document 202, a region of interest (ROI) associated with images for the characters, and/or the like. In some examples, certain properties 208 may be obtained from the document 202, such as information regarding an alignment and order of each character 302 in the text 204.

The processor 102 may fetch, decode, and execute the instructions 114 to retrieve images 212 associated with the plurality of characters 302 in the extracted text 310. In some examples, the processor 102 may retrieve the images 212 for the extracted characters 302 from the character information 210, such as a font file. By way of particular example, the processor 102 may retrieve glyph information including bitmap images for the plurality of characters 302 from the character information 210. In this regard, the images 212 may be a glyph, in a particular type face, size, and style (e.g., bold, underline), associated with each of the plurality of extracted characters 302. By way of particular example and for purposes of illustration, a font file may have a plurality of different glyphs for each character, in each available variation or format of the character. In this regard, for each variant of a font, the font file may include a complete set of glyphs, with each set including an image for each character. For instance, in a case in which a font has two sizes, and any combination of normal, bold, and italic, the font file may have 8 complete sets of images. As such, the image 212a may be associated with a particular one of the different glyphs in the font file that corresponds to the extracted character 302a, e.g., the lower case letter "e," as depicted in FIGS. 3B and 3C.

The processor 102 may fetch, decode, and execute the instructions 116 to generate a stitched image 214 using the retrieved images 212. In some examples, the processor 102 may position each of the images 212 for the plurality of characters 302 of the document 202 adjacent to each other to form a larger image, such as the stitched image 214 depicted in FIG. 3C, containing images 212 of the characters 302 of the text 204. In some examples, the images 212 may have a ROI around the respective glyphs, for instance, a respective width/height of the images 212. In this regard, the ROI for each character may be unique to that character and may have a different size than a ROI of another character.

The processor 102 may maintain an order and relative placement of each of the images 212 as in the document 202. In this regard, the processor 102 may omit any other types of objects in the document 202, such as spaces 306, graphical illustrations 308, and/or the like. By way of particular example and for purposes of illustration, the processor 102 may remove the space 306 and position the image 212a, which may be a bitmap image of a glyph for the character 302a, adjacent to the image 212b, which may be a bitmap image of a glyph for the character 302b, in the stitched image 214, as depicted in FIG. 3C.

The processor 102 may fetch, decode, and execute the instructions 118 to watermark the stitched image 214. In this regard, the processor 102 may add a watermark 216 to the stitched image 214 of the characters 302 of the text 204 found in the document 202. In some instances, the watermark 216 may be a physical watermark, such as a tint, a logo, and/or the like, added to the stitched image 214. The watermark 216 may be an invisible watermark, such as a digital watermark or stenography, which may only be perceptible under certain conditions, such as by using an algorithm.

The processor 102 may fetch, decode, and execute the instructions 120 to replace the characters 302 in the document 202 with the images 212 associated with the characters 302 from the stitched image 214. In this regard, one of the images 212 associated with the characters 302 may include a portion of the watermark 216 depending on the type of watermark that is embedded. For instance, in a case where the watermark 216 is a tint that is added to the entire stitched image 214, each of the plurality of images 212 may include a portion of the watermark 216. In some examples, in a case where the watermark 216 may not span the entire stitched image 214, such as when watermarking using a logo, some images 212 may include a portion of the watermark 216, while other images 212 may not include the watermark 216.

In some examples, the processor 102 may separate the images 212 associated with the characters 302 from the watermarked and stitched image 214. In this regard, each of the images 212 may have a respective ROI associated with the images 212. The ROI may define an area that each of the images 212 associated with the characters 302 occupies.

In some examples, the processor 102 may replace the characters 302 in the document 202 with the images 212 based on the properties 208 of the characters 302 stored in the temporary file 206. For instance, the processor 102 may replace the character 302a in the text 204 of the document 202 with the image 212a associated with the character 302a, as depicted in FIG. 3D. In some examples, the image 212a may be placed in the document 202 based on the ROI associated with the image 212a such that the spacing between adjacent images 212 of the characters 302 may correctly be set.

In some examples, the processor 102 may access the properties 208 for each of the characters 302 to position and align each of the images 212 according to the original alignment and order in the document 202. By way of particular example, the processor 102 may add the space 306 between the image 212a of character 302a and the image 212b of character 302b. In this regard, each of the images 212 may be positioned, using the properties 208 in the temporary file 206, to correctly recreate the original format/look of the document 202. In some examples, the images 212 for each of the characters 302 may be positioned on the document 202 at specific locations relative to other objects in the document 202, such as the graphical illustration 308, to recreate the original alignment and order of the characters 302 of the text 204 in the document 202, as depicted in FIG. 3D.

In some examples, the processor 102 may extract the watermark 216 that may be embedded in the document 202. In this regard, the processor 102 may scan the document 202 having the watermark 216, such as the watermarked images 212 for the characters 302. The processor 102 may identify the images 212 associated with the characters 302 in the scanned document 202 and construct a second stitched image (not shown) based on the identified images in the scanned document. In some examples, the second stitched image may be the same as the stitched image 214, as depicted in FIG. 3C. The processor 102 may extract the watermark 216 from the second stitched image. In some examples, the processor 102 may apply an algorithm to the second stitched image to extract the watermark 216.

In some examples, the system 200 may include a network 218 that is connected between the apparatus 100 and a server 220. The document 202, temporary file 206, stitched image 214, and/or the character information 210 may be stored on a data store 222 coupled to the server. The processor 102 may retrieve and store document 202, temporary file 206, stitched image 214, and/or the character information 210 either locally on the apparatus 100 or remotely on the data store 222.

Various manners in which a processor implemented on the apparatus 100 may operate are discussed in greater detail with respect to the method 400 depicted in FIG. 4. FIG. 4 depicts a flow diagram of an example method 400 for forming a stitched image 214 of extracted text 310 from a document 202 and embedding a watermark 216 in the stitched image 214 to generate a watermarked document. It should be understood that the method 400 depicted in FIG. 4 may include additional operations and that some of the operations described therein may be removed and/or modified without departing from the scope of the method 400. The description of the method 400 is made with reference to the features depicted in FIGS. 1, 2, and 3A to 3D for purposes of illustration.

At block 402, the processor 102 may extract text 204 from a document 202. In some examples, the extracted text may include a plurality of characters, such as the extracted text 310 for the plurality of characters 302 depicted in FIG. 3B. In some examples, the processor 102 may identify the plurality of characters 302 in the text 204 and a plurality of spaces between the plurality of characters 302, such as the space 306 depicted in FIG. 3A. The processor 102 may remove the plurality of spaces 306 from between the plurality of characters 302 to position the plurality of characters 302 adjacent to each other without the plurality of spaces 306.

The processor 102 may retrieve properties of the plurality of characters 302, such as properties 208 depicted in FIG. 2. In some examples, the processor 102 may retrieve the properties 208 from a character information 210 stored in the apparatus 100, from the data store 222 over the network 218, and/or the like. The processor 102 may store the properties 208 of the plurality of characters 302 in a temporary file, such as the temporary file 206 depicted in FIG. 2. In some examples, the properties 208 of the plurality of characters 302 may include a font, a size, a location, a line number associated with each of the plurality of characters 302 in the document 202, a page number associated with the plurality of characters 302 in the document 202, a ROI associated with the plurality of watermarked images, such as images 212 depicted in FIG. 3C, corresponding to the plurality of characters 302, and/or the like.

At block 404, the processor 102 may retrieve images corresponding to the plurality of characters 302, such as the images 212 depicted in FIGS. 2 and 3C. By way of particular example, the processor 102 may retrieve the images 212 corresponding to the plurality of characters 302 by retrieving bitmap images from the character information 210. In some examples, the character information 210 may be a font file, such as a TTF font file, or the like that stores bitmap images for each character font type, size, and style.

At block 406, the processor 102 may combine the images 212 to form a stitched image of the extracted text 310, such as the stitched image 214 depicted in FIG. 3C. The processor 102 may generate the stitched image 214 using the bitmap images. In this regard, the bitmap images for the plurality of characters 302 may be positioned adjacent to each other to form a larger image using a collection of all of the images 212 for the extracted characters 302.

At block 408, the processor 102 may embed a watermark, such as the watermark 216 depicted in FIG. 2, in the stitched image 214. In some instances, the watermark 216 may be a physical watermark, such as a tint, a logo, and/or the like, added to the stitched image 214. The watermark 216 may be an invisible watermark, such as for digital watermarking or digital stenography, which may only be perceptible under certain conditions, such as by using an algorithm.

At block 410, the processor 102 may separate the watermarked and stitched image 214 into a plurality of watermarked images, such as the images 212 depicted in FIG. 3C, corresponding to the plurality of characters 302. At block 412, the processor 102 may replace the plurality of characters 302 in the document 202 with the plurality of watermarked images 212 based on the properties 208 of the plurality of characters 302 stored in the temporary file 206. In this regard, the processor 102 may position each of the watermarked images 212 in the document 202 according to the original alignment and order of the characters 302 based on the properties 208 stored in the temporary file 206.

In some examples, the processor 102 may separate the watermarked and stitched image 214 into the plurality of watermarked images 212 based on a ROI associated with the plurality of characters 302. In this regard, the ROI may define an area of a watermarked image 212 for each of the plurality of characters 302. The processor 102 may replace the plurality of characters 302 in the text 204 of the document 202 with the plurality of watermarked images 212 such that each of the plurality of watermarked images 212 may occupy an area in the document 202 corresponding to the ROI.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 5:
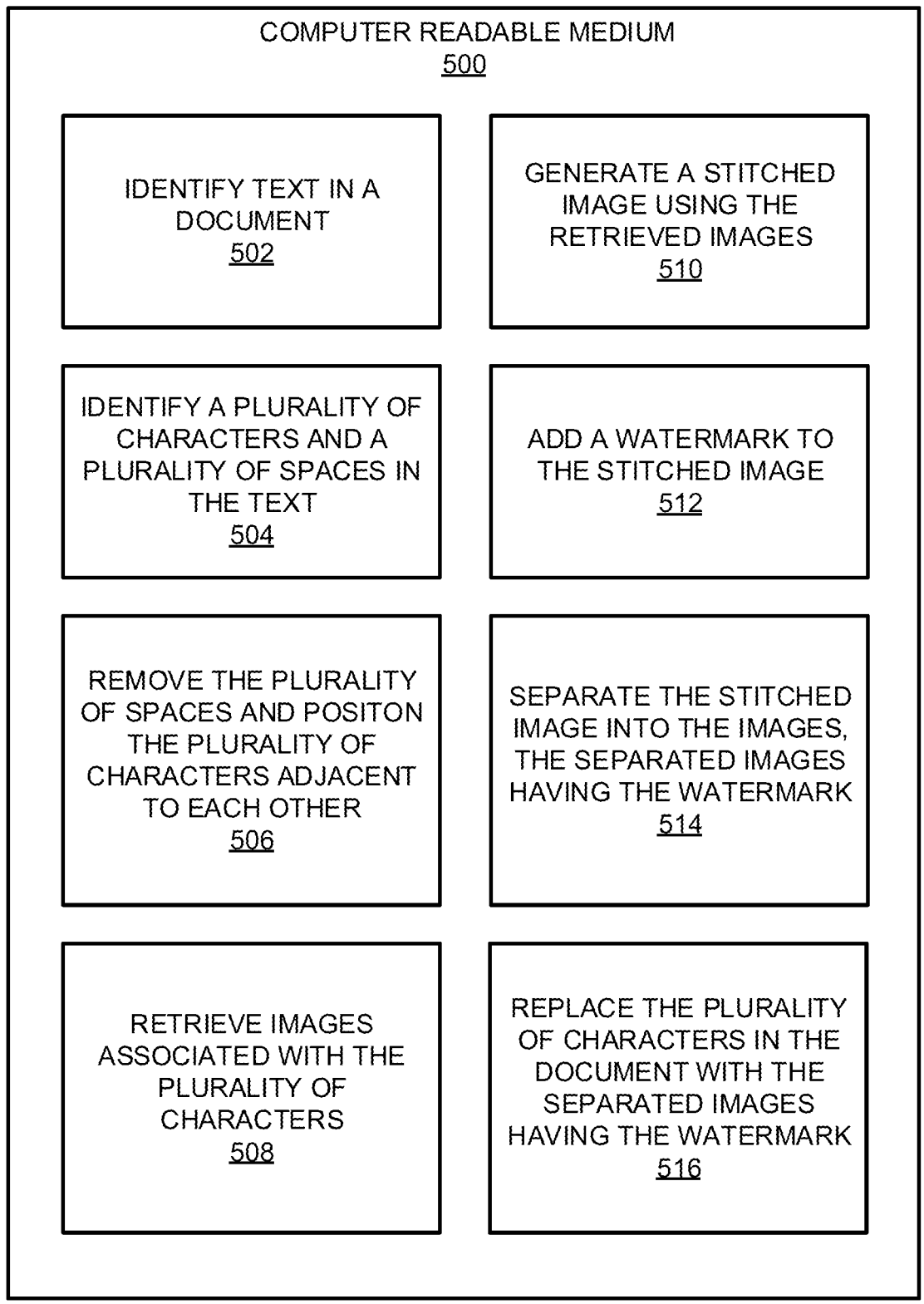
FIG. 5 depicts a block diagram of an example non-transitory computer-readable medium that may have stored thereon computer-readable instructions to generate a stitched image using retrieved images associated with a plurality of characters in a text of a document, add a watermark to the stitched image, and replace the plurality of characters in the document with portions of the stitched image having the watermark.

Turning now to FIG. 5, there is shown a block diagram of a non-transitory computer-readable medium 500 that may have stored thereon machine-readable instructions to generate a stitched image, such as the stitched image 214 depicted in FIG. 3B, using retrieved images associated with a plurality of characters in a text of a document, such as the images 212 associated with the plurality of characters 302 depicted in FIGS. 2 and 3A to 3C, add a watermark to the stitched image 214, such as the watermark 216 depicted in FIG. 2, and replace the plurality of characters 302 in the document 202 with portions of the stitched image 214 having the watermark 216. It should be understood that the computer-readable medium 500 depicted in FIG. 5 may include additional instructions and that some of the instructions described herein may be removed and/or modified without departing from the scope of the computer-readable medium 500 disclosed herein. The description of the computer-readable medium 500 is made with reference to the features depicted in FIGS. 1, 2, and 3A to 3D for purposes of illustration. The computer-readable medium 500 may be a non-transitory computer-readable medium. The term "non-transitory" does not encompass transitory propagating signals.

The computer-readable medium 500 may have stored thereon machine-readable instructions 502-516 that a processor disposed in apparatus 100 may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to identify text 204 in a document 202. The processor may fetch, decode, and execute the instructions 504 to identify a plurality of characters 302 and a plurality of spaces in the text 204, such as the space 306 depicted in FIG. 3A.

The processor may fetch, decode, and execute the instructions 506 to remove the plurality of spaces 306 and positon the plurality of characters 302 adjacent to each other. For instance, the processor may remove space 306 to position the character 302a adjacent to the character 302b, as depicted in FIG. 3B.

The processor may fetch, decode, and execute the instructions 508 to retrieve images associated with the plurality of characters 302, such as images 212 depicted in FIGS. 2 and FIGS. 3C and 3D. In some examples, the images 212 may be glyphs for a particular character and may be in the form of a bitmap image. The processor may fetch, decode, and execute the instructions 510 to generate a stitched image 214 using the retrieved images 212.

The processor may fetch, decode, and execute the instructions 512 to add a watermark 216 to the stitched image 214. In some examples, the processor may fetch, decode, and execute the instructions 514 to separate the stitched image 214 into the images 212. In this regard, the separated images 212 may include a portion of the watermark 216. The processor may fetch, decode, and execute the instructions 516 to replace the plurality of characters 302 in the document 202 with the separated images 212 having the watermark 216.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
a processor; and
a memory storing machine-readable instructions executable by the processor to:
extract text from a document;
retrieve images associated with characters in the extracted text;
generate a stitched image using the retrieved images;
watermark the stitched image; and
replace the characters in the document with the images associated with the characters from the watermarked and stitched image.

2. The apparatus of claim 1, wherein the instructions are executable by the processor to:
parse objects in the document, the parsed objects in the document including the text and a graphical illustration;
determine, based on the parsed objects, that an amount of the text in the document exceeds a predetermined threshold; and
based on the determination that the amount of the text in the document exceeds the predetermined threshold, extract the text from the document while ignoring the graphical illustration in the document.

3. The apparatus of claim 1, wherein the instructions are executable by the processor to:
retrieve properties of the characters in the extracted text;
store the retrieved properties of the characters in a temporary file; and
replace the characters in the document with the images based on the properties of the characters stored in the temporary file.

4. The apparatus of claim 3, wherein the properties of the characters include one or more than one of a font, a size, a location, a line number associated with each of the characters in the document, a page number associated with each of the characters in the document, and a region of interest (ROI) associated with each of the images for the characters.

5. The apparatus of claim 1, wherein the instructions cause the processor to, after the text has been extracted from the document:
identify a plurality of characters from the text and identify spaces between the plurality of characters from the text; and
remove the spaces and position the plurality of characters adjacent to each other,
wherein the images are retrieved by retrieving glyph information for the plurality of characters, the glyph information including bitmap images, and
wherein the stitched image is generated by using the bitmap images for the plurality of characters, the bitmap images in the stitched image being positioned adjacent to each other.

6. The apparatus of claim 5, wherein the plurality of characters are positioned attached to each in other in a predetermined order after the spaces have been removed,
and wherein the bitmap images in the stitched image are positioned adjacent to each other in the predetermined order.

7. The apparatus of claim 1, wherein the instructions are executable by the processor to:
separate the images associated with the characters from the watermarked and stitched image, the images having a region of interest (ROI) associated with each of the images, the ROI defining an area that each of the images associated with the characters occupies,
wherein the characters in the text of the document are replaced with the images associated with the characters such that the images are placed in the document based on the respective ROI.

8. The apparatus of claim 1, wherein the instructions are executable by the processor to:
scan the document having the watermark;
identify the images associated with the characters in the scanned document;
construct a second stitched image based on the identified images in the scanned document; and
extract the watermark from the second stitched image.

9. A method comprising:
extracting, by a processor, text from a document, the extracted text including a plurality of characters;
retrieving, by the processor, images corresponding to the plurality of characters;

combining, by the processor, the images to form a stitched image of the extracted text;

embedding, by the processor, a watermark in the stitched image;

separating, by the processor, the watermarked and stitched image into a plurality of watermarked images corresponding to the plurality of characters; and replacing, by the processor, the plurality of characters in the document with the plurality of watermarked images.

10. The method of claim 9, further comprising:

identifying the plurality of characters in the text and a plurality of spaces between the plurality of characters; and removing the plurality of spaces from between the plurality of characters to position the plurality of characters adjacent to each other without the plurality of spaces.

11. The method of claim 10, wherein the images are retrieved by retrieving bitmap images for the plurality of characters from a font file, and wherein the stitched image is generated by using the bitmap images, the bitmap images in the stitched image positioned adjacent to each other.

12. The method of claim 9, further comprising:

retrieving properties of the plurality of characters;

storing the properties of the plurality of characters in a temporary file; and replacing the plurality of characters in the document with the plurality of watermarked images based on the properties of the plurality of characters stored in the temporary file.

13. The method of claim 12, wherein the properties of the plurality of characters include one or more than one of a font, a size, a location, a line number associated with the plurality of characters in the document, a page number associated with the plurality of characters in the document, and a region of interest (ROI) associated with the plurality of watermarked images corresponding to the plurality of characters.

14. The method of claim 9, further comprising:

separating the watermarked and stitched image into the plurality of watermarked images based on a region of interest (ROI) associated with the plurality of characters, the ROI defining an area of a watermarked image for each of the plurality of characters, replacing wherein the plurality of characters in the text of the document are replaced with the plurality of watermarked images such that each of the plurality of watermarked images occupies an area in the document corresponding to the ROI.

15. The method of claim 9, further comprising, after the text has been extracted from the document:

identifying a plurality of characters from the text and identifying spaces between the plurality of characters from the text; and removing the spaces and positioning the plurality of characters adjacent to each other, wherein the images are retrieved by retrieving glyph information for the plurality of characters, the glyph information including bitmap images, and wherein the stitched image is generated by using the bitmap images for the plurality of characters, the bitmap images in the stitched image being positioned adjacent to each other.

16. The method of claim 15, wherein the plurality of characters are positioned attached to each in other in a predetermined order after the spaces have been removed, and wherein the bitmap images in the stitched image are positioned adjacent to each other in the predetermined order.

17. A non-transitory computer-readable medium storing on machine-readable instructions executable by a processor to:

identify text in a document;

identify a plurality of characters and a plurality of spaces in the text;

remove the plurality of spaces and position the plurality of characters adjacent to each other;

retrieve images associated with the plurality of characters;

generate a stitched image using the retrieved images;

add a watermark to the stitched image;

separate the stitched image into the images, the separated images having the watermark; and replace the plurality of characters in the document with the separated images having the watermark.

18. The non-transitory computer-readable medium of claim 17, wherein the instructions are executable by cause the processor to:

retrieve properties of the plurality of characters from either or both of the document and a font file;

store the properties of the plurality of characters in a temporary file; and access the properties in the temporary file to replace the plurality of characters in the document with the separated images having the watermark, wherein the properties of the plurality of characters include one or more than one of a font, a size, a location, a line number associated with the plurality of characters in the document, a page number associated with the plurality of characters in the document, and a region of interest (ROI) associated with the images associated with the plurality of characters.

19. The non-transitory computer-readable medium of claim 17, wherein the images are retrieved by retrieving glyph information for the plurality of characters, the glyph information including bitmap images, and wherein the stitched image is generated by using the bitmap images for the plurality of characters, the bitmap images in the stitched image being positioned adjacent to each other.

20. The non-transitory computer-readable medium of claim 19, wherein the plurality of characters are positioned attached to each in other in a predetermined order after the spaces have been removed, and wherein the bitmap images in the stitched image are positioned adjacent to each other in the predetermined order.

* * * * *